(12) United States Patent
Ferrington et al.

(10) Patent No.: US 11,838,423 B2
(45) Date of Patent: *Dec. 5, 2023

(54) HARDWARE NORMALIZATION FOR A MANAGED NETWORK

(71) Applicant: ServiceNow, Inc., Santa Clara, CA (US)

(72) Inventors: Eric Charles Ferrington, Washington, MI (US); Venkat Rao Vadranam, Hyderabad (IN); Vishal Reddy Wudaru, Kurnool (IN); Thankaselvi Kumaresan, Hyderabad (IN); Jugal Kishore, Samana (IN); Vijaya Sankara Gopisetty, Hyderabad (IN); Uttej Kumar Reddy Gade, Hyderabad (IN); Saurabh Dewan, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,847

(22) Filed: Aug. 31, 2022

(65) Prior Publication Data

US 2022/0417027 A1    Dec. 29, 2022

Related U.S. Application Data

(63) Continuation of application No. 16/780,599, filed on Feb. 3, 2020, now Pat. No. 11,477,029.

(30) Foreign Application Priority Data

Jan. 2, 2020 (IN) .............................. 202011000171

(51) Int. Cl.
    H04L 9/32       (2006.01)
    H04L 67/1097    (2022.01)
    (Continued)

(52) U.S. Cl.
    CPC .......... *H04L 9/3236* (2013.01); *G06F 3/0482* (2013.01); *G06Q 10/087* (2013.01); *H04L 41/0853* (2013.01); *H04L 67/1097* (2013.01)

(58) Field of Classification Search
    CPC ................................................... H04L 9/3236
    See application file for complete search history.

(56) References Cited

U.S. PATENT DOCUMENTS 5,978,594 A    11/1999  Bonnell
6,321,229 B1   11/2001  Goldman
(Continued)

*Primary Examiner* — Roland J Casillas
(74) *Attorney, Agent, or Firm* — FLETCHER YODER PC

(57) ABSTRACT

An embodiment involves persistent storage and one or more processors. The persistent storage may contain a plurality of hardware models specifying types of computing devices, wherein the hardware models include attributes representing manufacturer names, product names, and model numbers of the computing devices. The processors may be configured to: obtain, from the persistent storage, a hardware model; calculate a hash value over attributes of the hardware model; compare the hash value to hash values in a curated list, the curated list including normalized hardware models that map the hash values to normalized manufacturer names, normalized product names, or normalized model numbers; determine that the hash value matches a particular hash value for a normalized hardware model; and update, in the persistent storage, the hardware model to include at least one of a normalized manufacturer name, a normalized product name, or a normalized model number associated with the normalized hardware model.

20 Claims, 15 Drawing Sheets

(51) Int. Cl.
*G06F 3/0482* (2013.01)
*H04L 41/0853* (2022.01)
*G06Q 10/087* (2023.01)

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,877,783 B1 | 1/2011 | Cline |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,151,261 B2 | 4/2012 | Sirota |
| 8,346,752 B2 | 1/2013 | Sirota |
| 8,380,645 B2 | 2/2013 | Kowalski |
| 8,554,750 B2 | 10/2013 | Rangaranjan |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,907,988 B2 | 12/2014 | Poston |
| 9,015,188 B2 | 4/2015 | Behne |
| 9,037,536 B2 | 5/2015 | Vos |
| 9,137,115 B2 * | 9/2015 | Mayfield ............... G06Q 10/06 |
| 9,261,372 B2 | 2/2016 | Cline |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,659,051 B2 | 4/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 2006/0036684 A1* | 2/2006 | Schwerk ............... G06Q 10/10 709/204 |
| 2008/0259922 A1* | 10/2008 | White ............... H04L 41/0859 370/392 |
| 2012/0166732 A1* | 6/2012 | Wakayama ......... G06F 16/9574 711/E12.069 |

* cited by examiner

FIG. 9A 900
902
906
904
908
910

| General | Information | Compatibles | Substitutes | Normalization | Configuration Items | Product Catalog |

Display name: Tyrell Corp. RPC Z20
Manufacturer: Tyrell Corp.
Name: RPC

Short description:
Model categories: Server
Asset tracking strategy: Leave to category
Useful life (months):
Asset tracking unit: Individual Unit
Acquisition method: -- None --
Cost: $ 0.00
Depreciation: 
Salvage value: $ 0.00
Comments:

Model number: Z20
Barcode: 210-ACCW-SRV1
Owner:
Status: In Production
Expenditure type: -- None --
Certified: ☐

HARDWARE NORMALIZATION FOR A MANAGED NETWORK

CROSS-REFERENCE TO RELATED APPLICATION

This application is a continuation of U.S. patent application Ser. No. 16/780,599, entitled "HARDWARE NORMALIZATION FOR A MANAGED NETWORK", filed on Feb. 3, 2020, which claims priority to India Patent Application No. 202011000171, filed Jan. 2, 2020, both of which are hereby incorporated by reference in their entirety.

BACKGROUND

Enterprises may use one or more discovery tools to automatically identify and track computing hardware (e.g., routers, servers, load balancers) disposed upon their managed networks. These tools may identify the units of hardware by their respective manufacturer names, product names, model numbers, and/or other attributes, and store representations of the identified units as configuration items in a database. But each tool may use different criteria for forming such attributes—for example, one tool may refer to the manufacturer of a router as "ABC Corporation", another may refer to the manufacturer as "ABC Corp." and yet another may refer to the manufacturer as just "ABC". Further, users may manually enter configuration items into the database or upload them in bulk (e.g., from a spreadsheet). As a consequence, the same type of hardware might be identified in different ways, which reduces the utility of discovered configuration items and the database.

SUMMARY

The embodiments herein provide a normalization process for hardware discovered on a managed network. Particularly, discovery and/or manual processes may populate a database (e.g., a configuration management database, or CMDB) with configuration items related to the hardware. The configuration items may contain or refer to information that defines a manufacturer name, product name, and/or a model number of the discovered hardware (e.g., a hardware model). Entries for new hardware models may be added during discovery or manual updates of the database. As noted above, the hardware can represented by multiple hardware models due to the use of different discovery tools, errors during manual editing, or the manufacturers themselves using different attribute values to characterize the hardware.

Periodically or from time to time, a normalization application may traverse some or all of the hardware models in the database and attempt to standardize their attributes to canonical values. These canonical values may be defined in a curated list that accurately characterizes the hardware. Ideally, this can reduce the number of hardware models per type of hardware down to one, or at least a manageable number close to one.

For example, manufacturer names for "ABC Corporation", "ABC Corp.", and "ABC", may all be normalized to "ABC Corp." Similar normalization may occur for product names, model numbers, and other attributes. For instance, the product names of "PowerRoute" and "PowerRouter" may be normalized to "PowerRoute", and the model numbers "R220", "R220v2", and "R220-2" may be normalized to "R220".

The normalized values for attributes representing manufacturer names, product names, model numbers, and/or other normalized attributes may be written to the appropriate database tables. In this fashion, the same units of hardware that are characterized differently in the database can be re-characterized in a consistent fashion. Configuration items referring to these models may then benefit from this accuracy, thus dramatically improving the utility of the database.

Further, depending on how a manufacturer name, product name, or model entry is normalized, it may be updated with an indication of its normalization status. Supported normalization statuses may include new (normalization has not yet taken place for the entry), normalized (the entry was matched to a canonical entry in the curated list based on its manufacturer name, model name, and model number), partially normalized (the entry was matched to a canonical entry in the curated list based on its product name or a combination of its manufacturer name and product name), manufacturer normalized (the entry was matched to a canonical entry in the curated list based just on its manufacturer name), manually normalized (the entry was normalized when a user updated one or more of its manufacturer name, model name, model number, or device type), and match not found (the entry could not be matched to any canonical entry in the curated list).

Moreover, the curated list may include, for each model referenced therein, indications of the following dates (if known): end of sale, end of life, end of support, end of extended support. This information can be used by a remote network management platform to provide an overview of hardware that is approaching or has passed any of these dates.

Accordingly, a first example embodiment may involve a computational instance of a remote network management platform, the computational instance including persistent storage and one or more processors. The persistent storage may contain a plurality of hardware models, the hardware models specifying types of computing devices that are disposed upon a managed network associated with the computational instance, wherein the hardware models respectively include attributes representing manufacturer names, product names, and model numbers of the computing devices. The one or more processors may be configured to: (i) obtain, from the persistent storage, a hardware model of the plurality of hardware models; (ii) calculate a hash value by applying a hash function to at least some of the attributes of the hardware model; (iii) compare the hash value to a plurality of hash values in a curated hardware list, wherein the curated hardware list includes normalized hardware models that map the hash values to normalized manufacturer names, normalized product names, or normalized model numbers; (iv) determine that the hash value calculated for the hardware model matches a particular hash value for a normalized hardware model in the curated hardware list; and (v) update, in the persistent storage, the hardware model to include at least one of a normalized manufacturer name, a normalized product name, or a normalized model number associated with the normalized hardware model.

A second example embodiment may involve obtaining, from persistent storage of a computational instance, a hardware model of a plurality of hardware models, the hardware models specifying types of computing devices that are disposed upon a managed network associated with the computational instance, wherein the hardware models respectively include attributes representing manufacturer names, product names, and model numbers of the computing devices. The second example embodiment may further involve calculating a hash value by applying a hash function to at least some of the attributes of the hardware model. The second example embodiment may further involve comparing the hash value to a plurality of hash values in a curated hardware list, wherein the curated hardware list includes normalized hardware models that map the hash values to normalized manufacturer names, normalized product names, or normalized model numbers. The second example embodiment may further involve determining that the hash value calculated for the hardware model matches a particular hash value for a normalized hardware model in the curated hardware list. The second example embodiment may further involve updating, in the persistent storage, the hardware model to include at least one of a normalized manufacturer name, a normalized product name, or a normalized model number associated with the normalized hardware model.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 9A, 9B, 9C, 9D, and 9E depict graphical user interfaces, in accordance with example embodiments.

DETAILED DESCRIPTION

Figure 1:
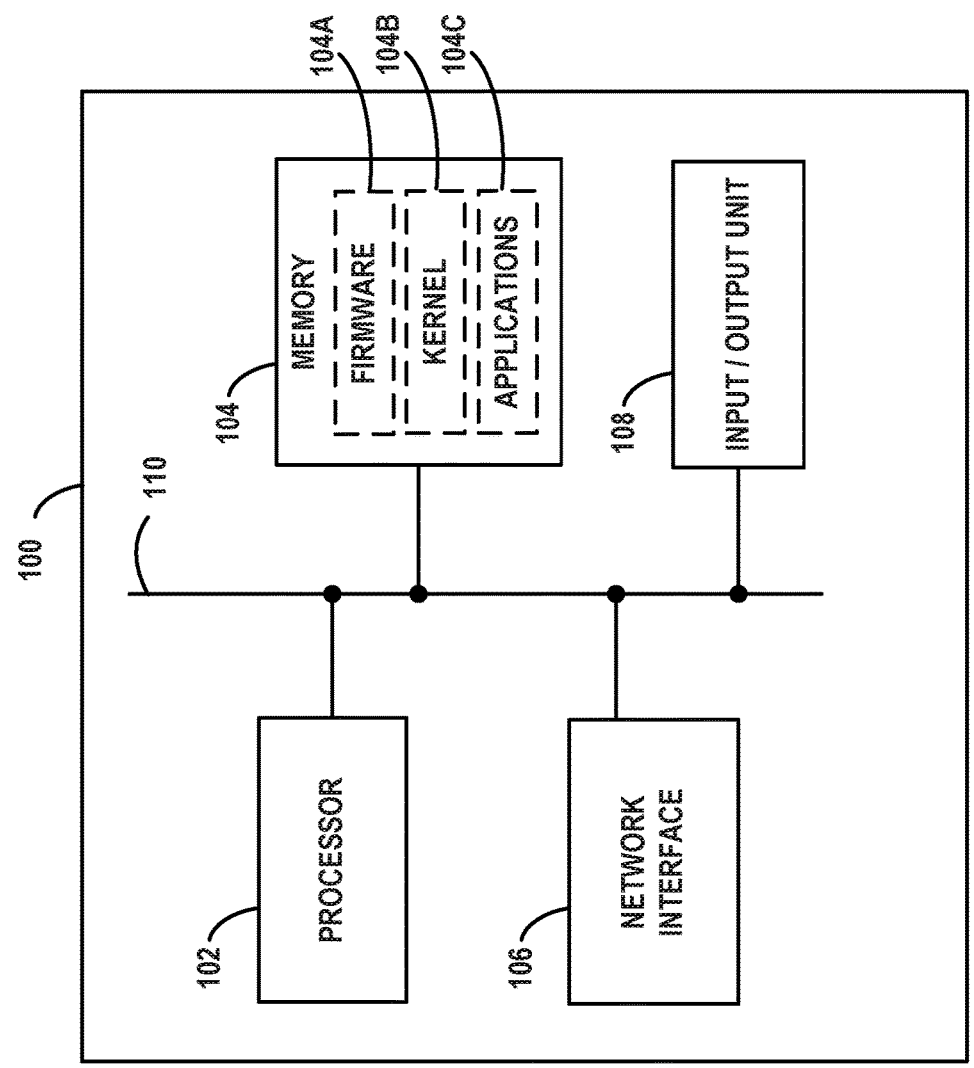
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
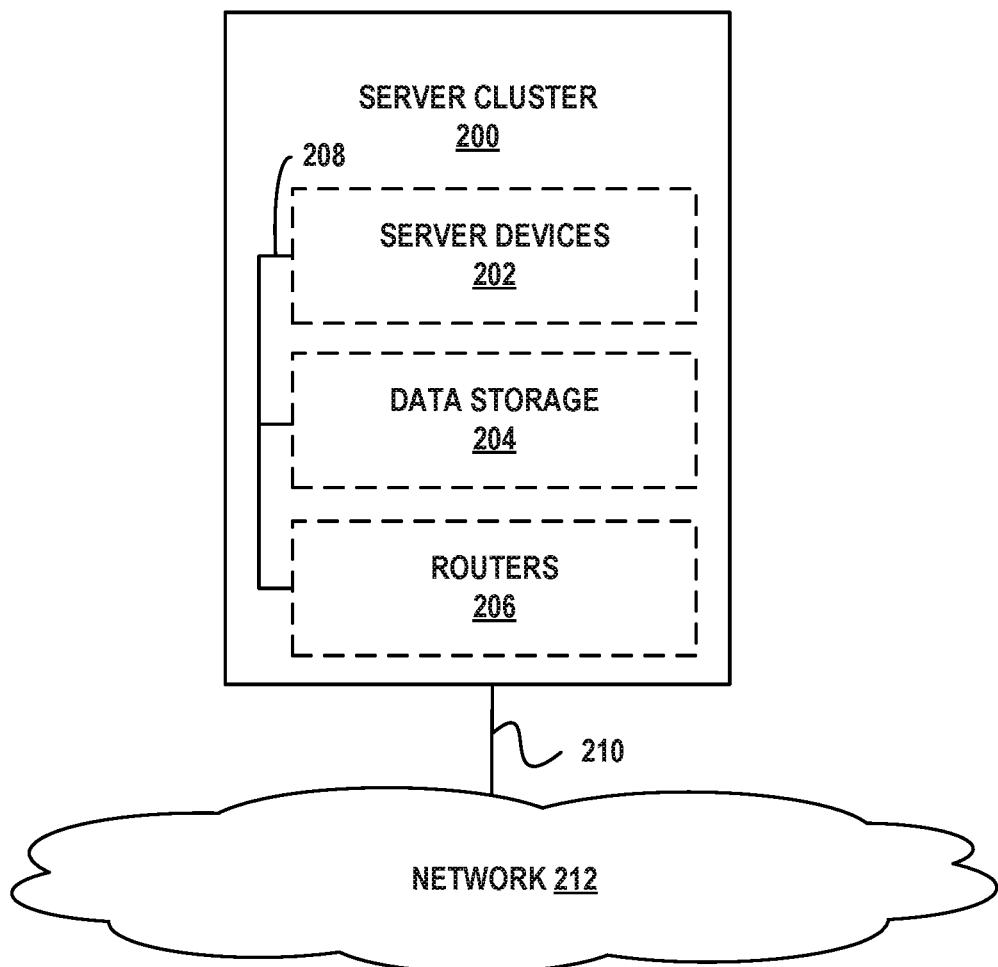
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
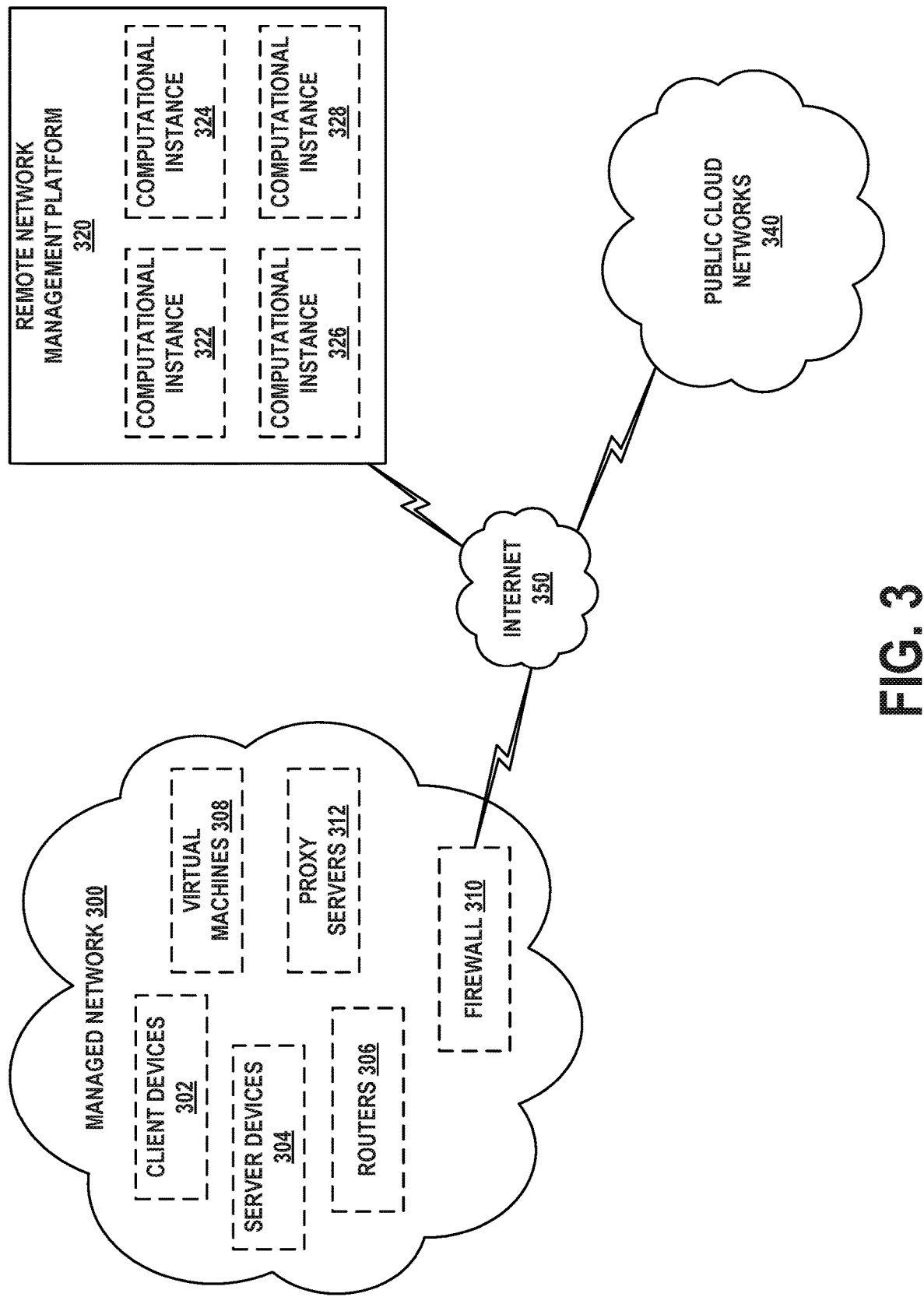
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
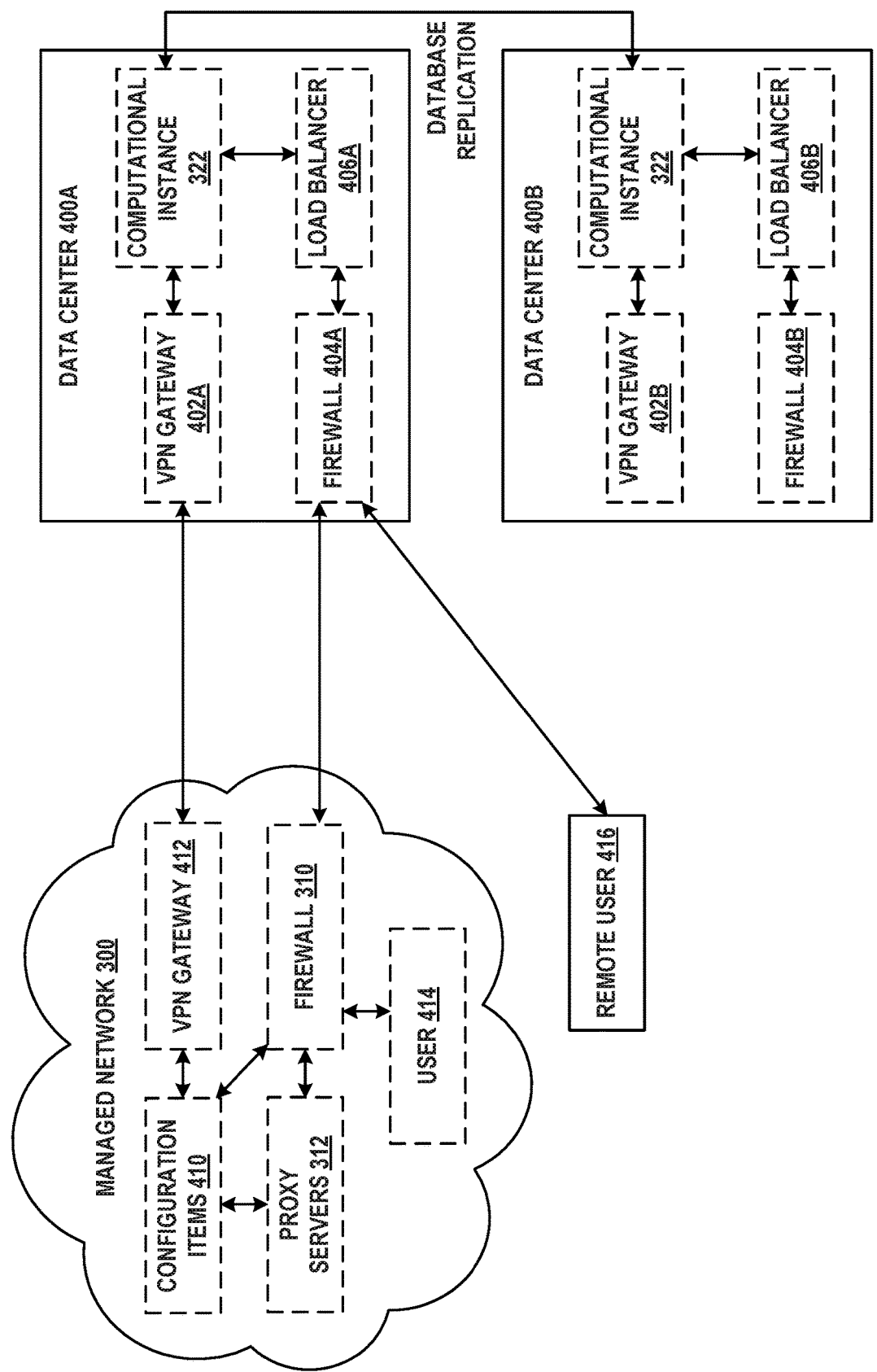
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
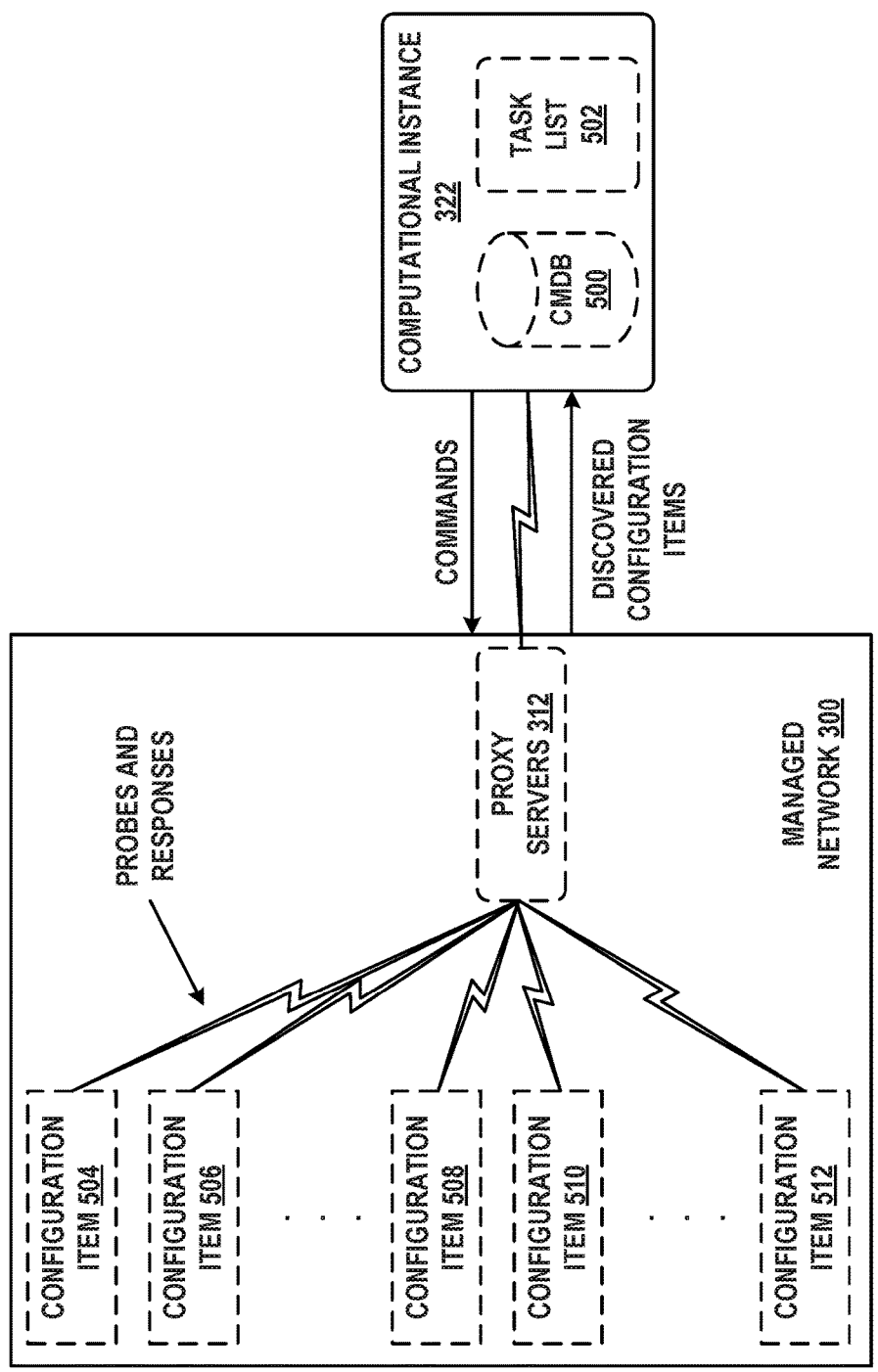
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
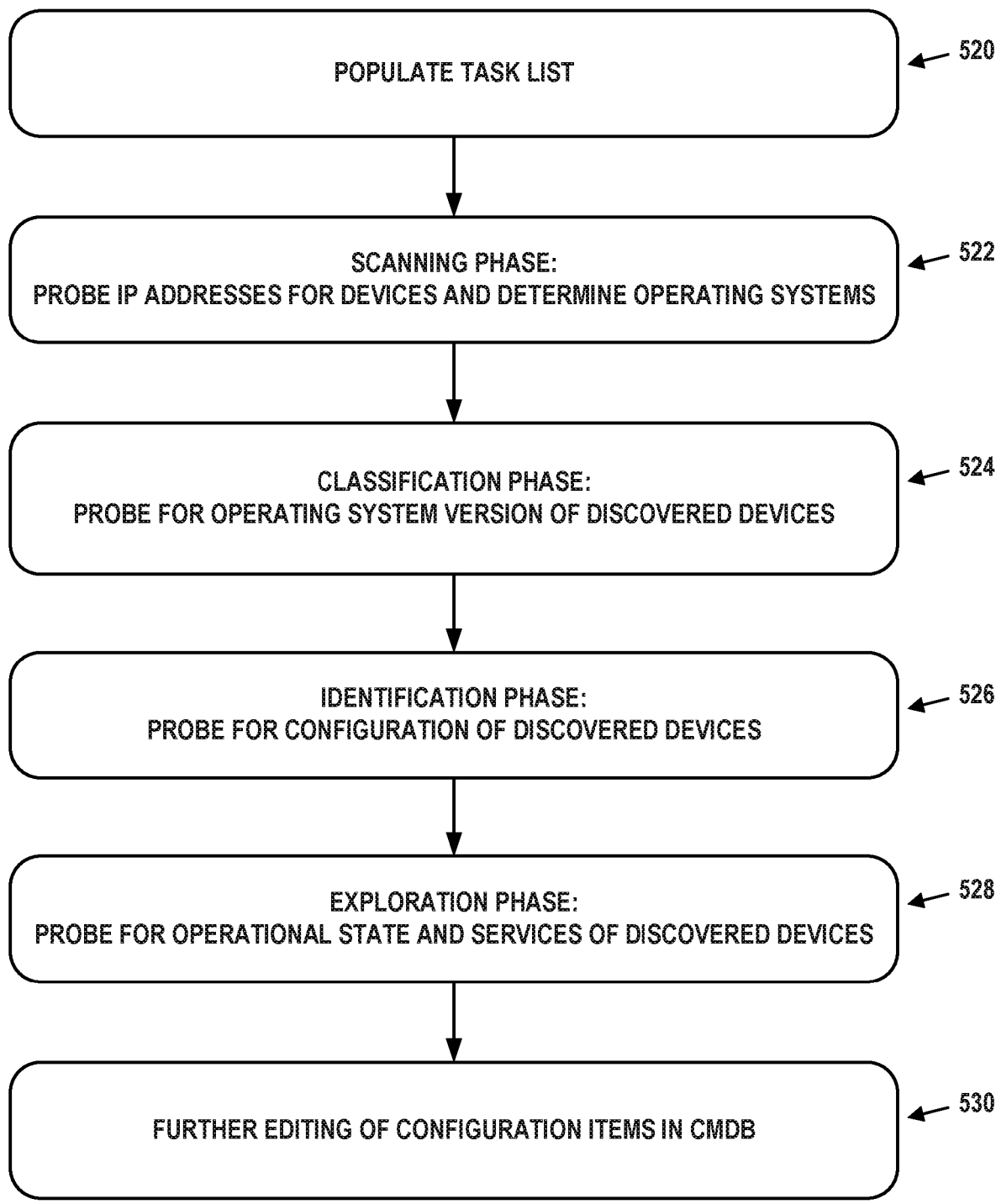
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. HARDWARE NORMALIZATION

As noted above, managed networks (such as managed network 300) may have disposed within them numerous hardware devices, such as laptop computers, desktop computers, routers, switches, firewalls, load balancers, databases, and so on. These hardware devices may be discovered and represented as configuration items. Alternatively, configuration items may be bulk uploaded or manually entered into a CMDB for some of the hardware devices.

Models of hardware devices (referred to herein as "hardware models") may be represented by the attributes in Table 1 below. More or fewer attributes may be used. For example, additional attributes may include a short description, cost, salvage value, and comments.

TABLE 1

| Attribute | Type | Description |
|---|---|---|
| Manufacturer name | String | The company that built the model. |
| Product name | String | The manufacturer-assigned name of the model |
| Model number | String | The specific model number assigned to the item by the manufacturer. |
| Owner | String | The person responsible for the model. |
| Status | Enumerated | In production, retired, or sold. |
| Configuration items | References | The configuration items created from this model. |

In some embodiments, the content of Table 1 may be stored in a single table in the CMDB. In other embodiments, the CMDB may be arranged with one table for hardware models and another for manufacturers, with entries in the hardware model table referring to entries in the manufacturer table. In either of these possibilities, hardware configuration items may refer to the hardware model table for definitions of their hardware model and manufacturer. Nonetheless, database tables can be arranged in various ways and alternative embodiments are possible. For purposes of simplicity, the description herein assumes a CMDB table (referred to herein as a "model table") containing some or all of the hardware model information of Table 1, and that hardware configuration items may refer to the this model table.

As noted previously, due to how the CMDB is populated, there may be multiple entries in such a model table for hardware devices of the same actual model. For example, laptop manufacturer Tyrell Corporation may provide laptops with a product name of RPC and the model number Z20. But the CMDB may have been populated such that there are five actual models for these laptops, as shown in Table 2.

TABLE 2

| Model in CMDB | Manufacturer name | Product name | Model number |
|---|---|---|---|
| 1 | Tyrell | RPC | Z20 |
| 2 | Tyrell Corp. | RPC | Z20 |
| 3 | Tyrell Inc. | RPC | Z20 |
| 4 | Tyrell Inc. | Replicant | Z20 |
| 5 | Tyrel | | Z20 |

These differences may be due to inconsistencies in how various discovery applications categorize discovered hardware and/or inconsistencies in how configuration items were manually entered or updated. To that point, some models in Table 2 use different representations of the manufacturer name, misspell the manufacturer name, have a different representation of the product name ("Replicant" versus "RPC"), leave the product name blank, or have an incorrect representation of the model number (e.g., "Z 20" instead of "Z20").

There may be numerous configuration items referring to each of these models. As a consequence, the CMDB may not accurately or conveniently represent the true deployment extent of the hardware model in question. For example, searching for all instances of the actual hardware model may be difficult, as multiple search criteria for the five models in Table 2 would have to be entered. This reduces the utility of the CMDB and any application (e.g., IT service management, IT operations management, IT asset management) that relies upon data in the CMDB.

In order to mitigate problems related to inconsistent or incomplete hardware attributes in the CMDB, hardware normalization can be used. In general, hardware normalization refers to the act of verifying that the model table in the CMDB consistently and accurately characterizes actual hardware models, and updating the model table as needed to represent hardware models consistently. Hardware normalization can be an automated process that executes periodically or from time to time (e.g., one per day or one per week).

Figure 6:
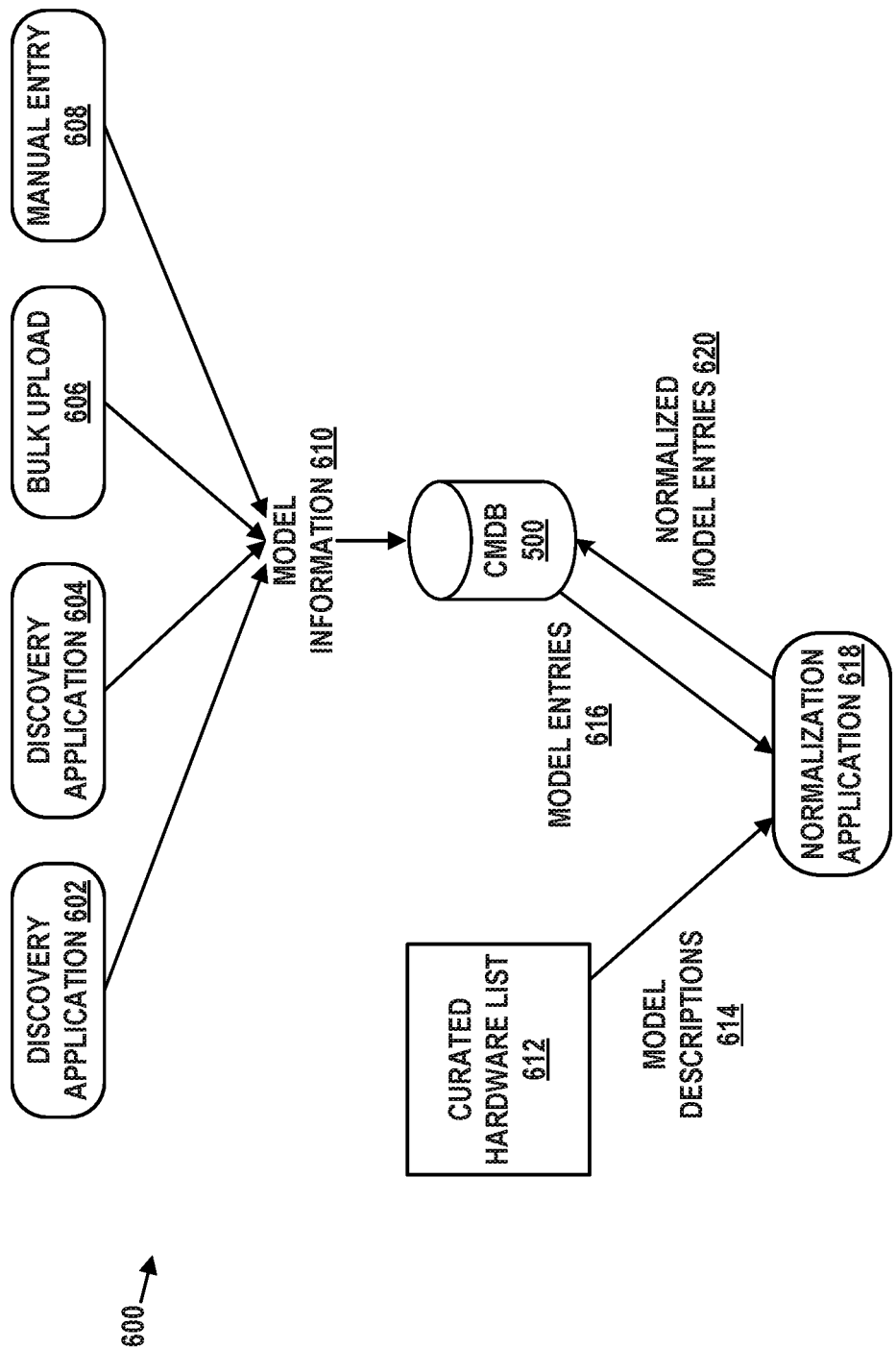
FIG. 6 is a schematic diagram representing hardware normalization, in accordance with example embodiments.

FIG. 6 depicts a schematic diagram 600 representing a possible technique for hardware normalization. Discovery applications 602 and 604, bulk upload process 606, and manual entry process 608 may provide representations of model information 610 into CMDB 500. For instance, as hardware devices are discovered on a managed network, the discovery process may probe the hardware devices to identify manufacturer information thereof (e.g., by reading configuration files, SNMP objects, etc.). This information is then used to either classify the hardware devices in accordance with an existing hardware model or to create a new hardware model if the information does not match any existing hardware model. CMDB 500 may, in turn, store this information in entries of a model table. CMDB 500 may also store configuration items for each discovered hardware device, with these configuration items referring to the appropriate entries in the model table.

As noted previously, some embodiments may store manufacturer information, such as manufacturer names, in a separate table. In these embodiments, entries in the model table may refer to entries in the manufacturer table rather than have a separate attribute for manufacturer name. But for purposes of simplicity, in the discussion below the hardware model will be assumed to be fully specified in one table.

FIG. 6 also includes curated hardware list 612. This list is manually updated and contains canonical entries (model descriptions 614) for each known hardware device. Model descriptions 614 include accurate and consistent values for manufacturer name, product name, model number, and other information. Curated hardware list 612 will be described in more detail below. For purposes of the embodiments herein, model descriptions 614 of curated hardware list 612 are considered to contain the correct representations of information that could appear in the model table of CMDB 500. Model descriptions 614 may be referred to a "normalized hardware models".

Not unlike the arrangement of the CMDB, models descriptions 614 and manufacturers may be represented in a logically distinct fashion in curated hardware list 612. For example, a list of canonical manufacturer names may be stored separately from model descriptions 614. Again for purposes of simplicity, in the discussion below curated hardware list 612 will be assumed to contain both hardware model and manufacturer information.

Normalization application 618 is a software program or programs that executes within computational instance 322 and/or remote network management platform 320. It may be configured to execute on a regular basis (e.g., once per day at a pre-determined time), on the completion of discovery, and/or whenever a new entry in the model table is created or an existing entry is modified.

Normalization application 618 may obtain model descriptions 614 from curated hardware list 612 and model entries 616 from the model table of CMDB 500. Normalization application 618 may further compare model entries 616 to model descriptions 614 by applying normalization rules. These normalization rules will be discussed in more detail below.

When an entry in model entries 616 matches one of model descriptions 614, normalization application 618 may update the model entry to reflect its normalized values. This may involve overwriting information in the model entry with the respective normalized values. Alternatively, the model entries may include attributes for normalized values and normalization application 618 may update the model entry by adding the normalized values to the entry while leaving at least some of the discovered values as is. Regardless, normalization application 618 may provide normalized model entries 620 to CMDB 500.

A. Example Curated Model Entry

Figure 7:
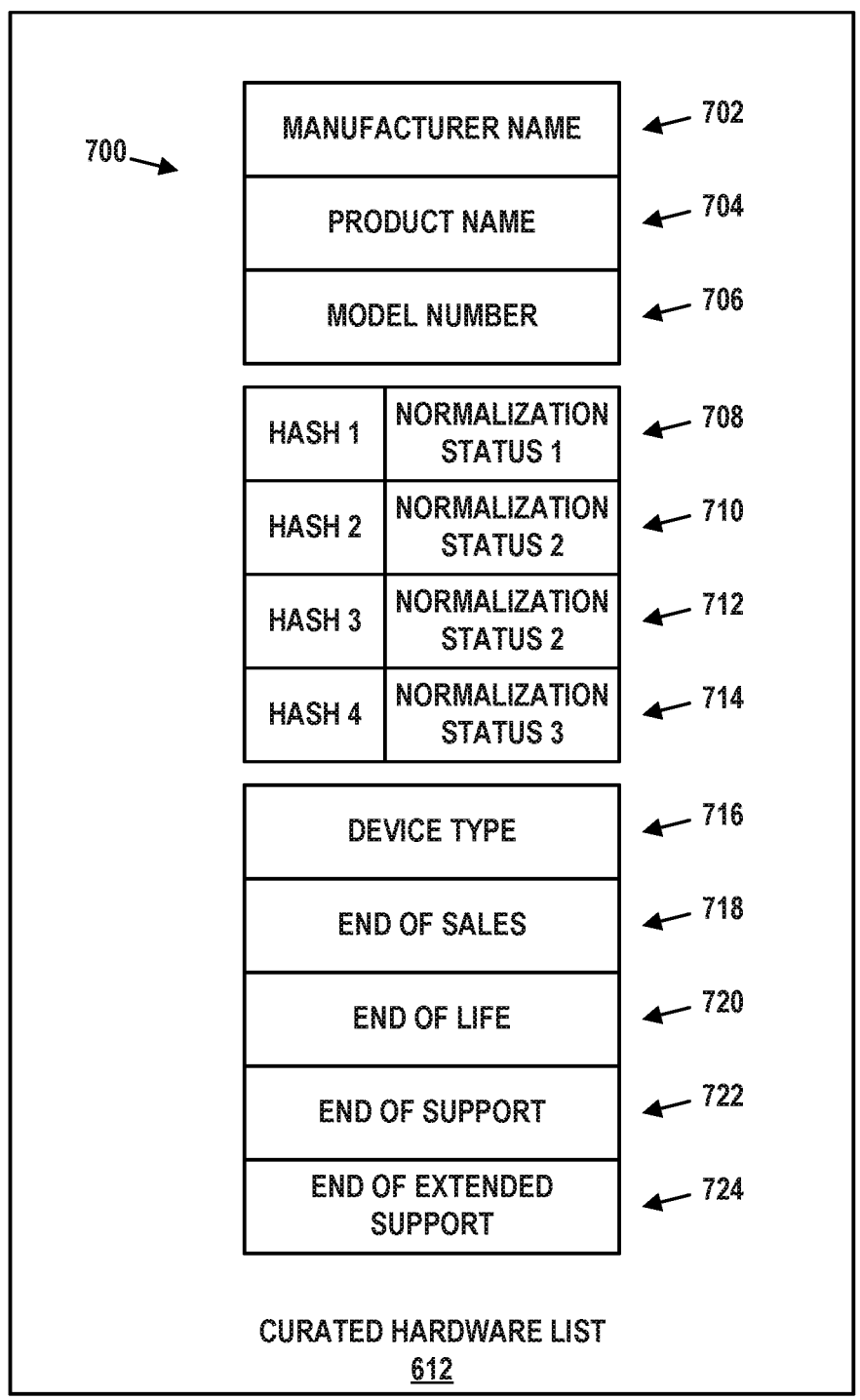
FIG. 7 depicts a curated hardware list, in accordance with example embodiments.

FIG. 7 depicts curated hardware list 612 in more detail. This list may be maintained in a central instance of remote network management platform 320. Each computational instance therein may be configured to obtain a fresh copy of curated hardware list 612 on a periodic basis or from time to time (e.g., once per week).

Entry 700 represents the attributes of a single normalized hardware model within curated hardware list 612. Thus, curated hardware list 612 may contain many such entries. Entry 700 is shown for purposes of example, and therefore more or fewer attributes may be present.

Manufacturer name 702 represents the name of the hardware manufacturer. In some embodiments, this attribute may be referred to as the "manufacturer" or "vendor".

Product name 704 represents the name of the hardware product. In some embodiments, this attribute may be referred to as the "product" or "model name".

Model number 706 represents the model number of the hardware. In some embodiments, this attribute may be referred to as the "model".

Attributes 708, 710, 712, and 714 represent mappings between hash values and normalization statuses. The hash values are predetermined results of a hash function (e.g., SHA-256 or another sufficiently robust hash function) calculated over various combinations of attributes in the entry, each representing a normalization status. In some cases, the different hash values may map to the same normalization status. Use of attributes 708, 710, 712, and 714 during normalization is described below.

Device type 716 represents a device type of the hardware. Values of the attribute may be, for example, "laptop", "desktop", "server", "router", and so on.

End of sales 718 represents the last date to order the hardware by way of the manufacturer. After this date, the hardware is no longer for sale from the manufacturer.

End of life 720 represents the date on which the hardware reaches the end of its useful life (from the manufacturer's point of view).

End of support 722 represents the date on which the hardware is no longer supported with new features from the manufacturer.

End of extended support 724 represents the date on which the hardware is no longer supported with patches or bug fixes from the manufacturer. Often, extended support requires a specific contract to be in place between the manufacturer and the entity receiving the extended support.

In some embodiments, the definitions of end of sales 718, end of life 720, end of support 722, and end of extended support 724 may vary and/or overlap to some extent. Different manufacturers may interpret these dates differently. Further, some of these dates may be blank or empty in entry 700 because they have not yet been announced by the manufacturer.

Notably, end of sales 718, end of life 720, end of support 722, and end of extended support 724 cannot be discovered and are instead manually curated. Nonetheless, they provide valuable information to IT professionals managing an enterprise.

B. Example Normalization Algorithm

Figure 8:
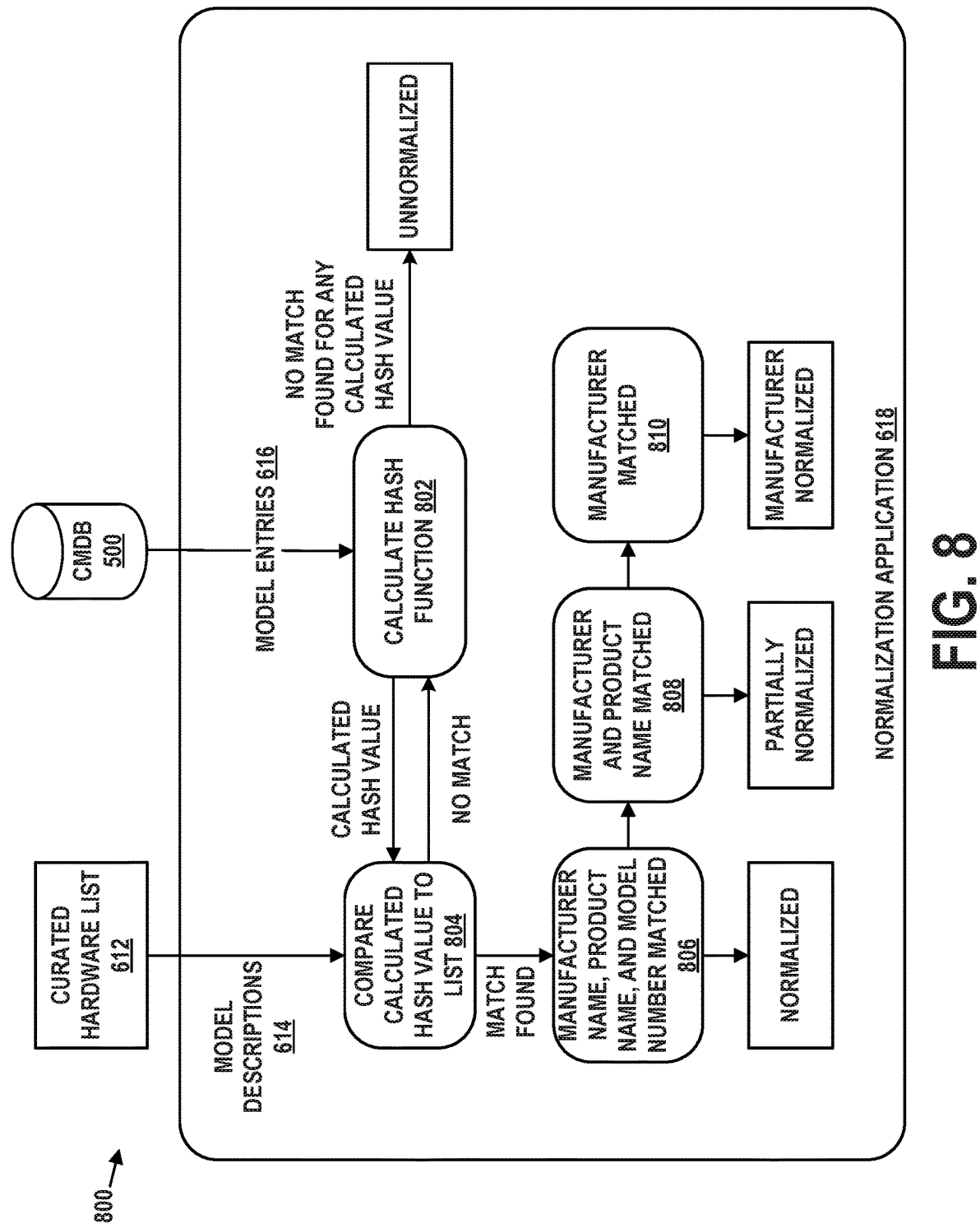
FIG. 8 is a flow chart that case be used to determine a normalization status of a hardware model, in accordance with example embodiments.

FIG. 8 depicts flow chart 800, representing a normalization procedure. As noted above, normalization may be carried out by normalization application 618 executing on computational instance 322 of remote network management platform 320.

At block 802, normalization application 618 receives model entries 616 from CMDB 500 and calculates a hash function one or more times over various combinations of attributes in each of these entries. In one example, the hash function may take as input a concatenation of the manufacturer name, product name, and model number of a model entry. In another example, the hash function may take as input a concatenation of the manufacturer name and model number of a model entry.

Various types of delimiters may be placed between these attributes. For example, space delimiters may be used so that the concatenation is "<manufacturer name><product name><model number>", and the hash function may be calculated over the resulting string. Alternatively, newline or tab delimiters may be used. If any of the manufacturer name, product name, or model number is blank or otherwise does not have a value, that attribute may be represented by an empty string in the concatenation.

At block 804, normalization application 618 receives model descriptions 614 from curated hardware list 612 and compares a calculated hash to the predetermined hash values in this list. If there is no match, control returns to block 802 and new hash value is calculated, this time over a different set of parameters. Then, at block 804 once again, this new hash value is compared to those in model descriptions 614.

The process of calculating new hash values at block 802 and comparing them at block 804 continues until there is a match or there are no more hash values to be calculated in block 802. If a match is found, then normalization application 618 classifies the type of match as a normalization value. The normalization value indicates the manner in which the model entry has been normalized. If there is no match for any calculated hash value, then the model entry is not in the curated hardware list 612 and is marked as unnormalized.

As noted, multiple hash values may be calculated for each model entry. Notably, while a model description in curated hardware list 612 may have only one set of canonical values for manufacturer name, product name, and model number, it may contain multiple predetermined hash values so that combinations of these attributes and variations of their values can be matched.

For example, an entry in curated hardware list 612 may contain separate predetermined hash values calculated over the following combinations of attributes: (1) manufacturer name, product name, model number, (2) manufacturer name, model number, and (3) manufacturer name, product name. This allows matching even when not all of the manufacturer name, product name, or model number are present in a model entry of CMDB 500. Support for hash values calculated over variations of attribute values may allow a model entry of CMDB 500 to be matched even when its attributes contain misspellings and/or abbreviations.

For example, given the hardware model discussed in the context of Table 2, suppose that the canonical values for manufacturer name is "Tyrell Corp.", for product name is "RPC", and for model number is "Z20" in curated hardware list 612. The model description may include numerous mappings between possible hash values and the associated normalization statuses. Table 3 represents some of these possible hash values and their mapped normalization statuses.

TABLE 3

| Line | Hash Values | Normalization Status |
|---|---|---|
| 1 | Hash1 ("Tyrell Corp. RPC Z20") | Normalized |
| 2 | Hash2 ("Tyrell RPC Z20") | Normalized |
| 3 | Hash3 ("Tyrell Inc. RPC Z20") | Normalized |
| 4 | Hash4 ("Tyrell Corp. RPC") | Partially Normalized |
| 5 | Hash5 ("RPC") | Partially Normalized |
| 6 | Hash6 ("Tyrell RPC") | Partially Normalized |
| 7 | Hash7 ("Tyrell Corp.") | Manufacturer Normalized |
| 8 | Hash8 ("Tyrell Inc") | Manufacturer Normalized |

For instance, line 1 indicates that, for a model entry being normalized, when the manufacturer name is "Tyrell Corp.", the product name is "RPC", and the model number is "Z20", a hash function calculated over these attributes matches a predetermined hash value of the canonical values. Thus, the normalization status is "normalized".

Lines 2 and 3 also result in the normalization status being "normalized". But in these cases, different ways of representing the manufacturer name, "Tyrell" and "Tyrell Inc." are used. Thus, the model entry can have a manufacturer name of "Tyrell" or "Tyrell Inc." but still have a normalization status of "normalized". These entries take into account how different discovery tools may represent manufacturer names differently.

Line 4 indicates that, for a model entry being normalized, when the manufacturer name is "Tyrell Corp." and the product name is "RPC" but the model number cannot be matched, the normalization status of the model entry is "partially normalized". Line 5 indicates that a model entry in which only the product name matches will also be considered "partially normalized". Line 6 indicates that a model entry in which the manufacturer name is misspelled and the product name matches will also be considered "partially normalized".

Line 7 indicates that when only the manufacturer name is matched, the model entry is considered "manufacturer normalized". Line 8 indicates that this is the also case when a particular alternative spelling of the manufacturer name is matched.

Given the large number of possible misspellings or alternative spellings of manufacturer names, product names, and model numbers, the extent of predetermined hash values in a model description from curated hardware list 612 can grow quite large (e.g., dozens or more).

In possible embodiments of blocks 802, 804, 806, 808, and 810, hash values may be calculated over the attributes of a model entry and then compared to curated hardware list 612 in the following fashion. First, hash values that would result in a normalization status of "normalized" are calculated. These may include hash values calculated over the manufacturer name, product name, and model number, as well as misspellings and/or alternative spellings thereof. As indicated at block 806, if any of these hash values match a predetermined hash value from curated hardware list 612, the model entry is marked as "normalized".

Then, hash values that would result in a normalization status of "partially normalized" are calculated. These may include hash values calculated over the manufacturer name and product name or just the product name, as well as misspellings and/or alternative spellings thereof. As indicated at block 808, if any of these hash values match a predetermined hash value from curated hardware list 612, the model entry is marked as "partially normalized".

Then, hash values that would result in a normalization status of "manufacturer normalized" are calculated. These may include hash values calculated over just the manufacturer name, as well as misspellings and/or alternative spellings thereof. As indicated at block 810, if any of these hash values match a predetermined hash value from curated hardware list 612, the model entry is marked as "manufacturer normalized".

Manual normalization is not explicitly addressed in FIG. 8. Nonetheless, if a user manually updated any of the manufacturer name, product name, or model number of a model entry, the normalization process of FIG. 8 may be carried out automatically. If there is a match between any of the calculated hash values and a predetermined hash value from curated hardware list 612, the normalization status is set to "manually normalized" regardless of what attributes were used in the hash function.

C. Example Graphical User Interfaces

FIGS. 9A-9E depict example graphical user interfaces (GUIs) related to hardware normalization. These GUIs may be generated by computational instance 322, for example, and provided to a client device related to managed network 300. Each of these GUIs provides information about normalized hardware on managed network, regardless of how it was discovered or manually entered, in a fashion that allows rapid assessment of how the hardware has been normalized as well as any upcoming dates of importance associated with hardware models.

FIG. 9A depicts GUI 900 of a hardware model from CDMB 500. A header of GUI 900 displays the manufacturer name 902 ("Manufacturer") and product name 904 ("Name"). GUI 900 also includes a row of tabs, including tab 906 and tab 908. When selected as shown in FIG. 9A, tab 906 displays general information about the hardware model. This includes the model number 910.

Figure 9B:
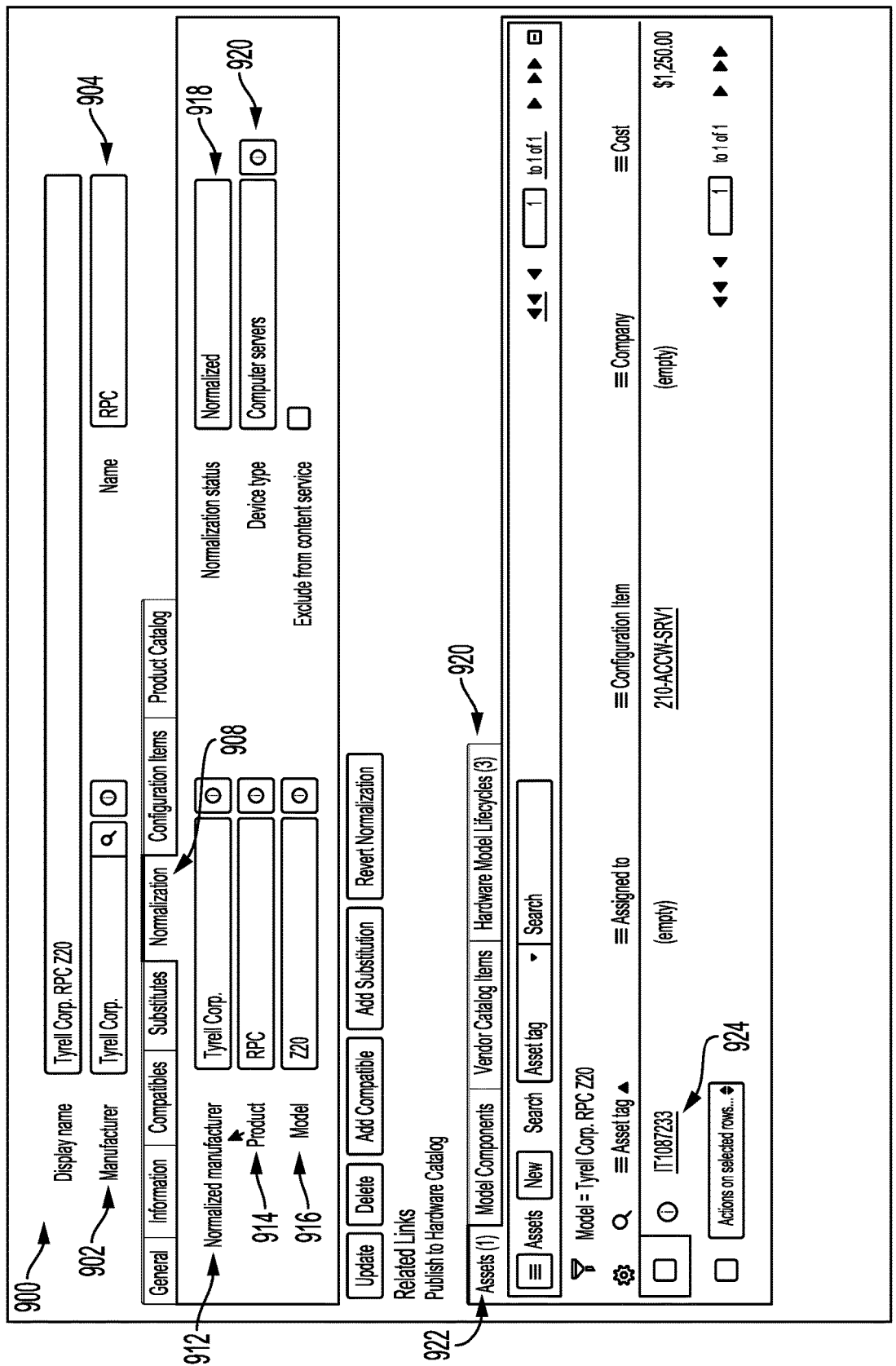

FIG. 9B depicts GUI 900 with tab 908 selected. Accordingly, GUI 900 displays information regarding how the hardware model was normalized. This includes normalized values for the manufacturer name 912 ("Normalized manufacturer"), product name 914 ("Product"), model number 916 ("Model"), normalization status 918, and device type 920. Notably, normalization status is 918 "Normalized", indicating that a manufacturer name 912, product name 914, model number 916 were matched. Thus, these and other attributes have been populated with canonical values for the associated hardware model in curated hardware list 612. For example, device type 920 has been populated from curated hardware list 612 as well, in this case with a value of "Computer servers".

FIG. 9B also displays a second row of tabs, including tab 922 and tab 924. When selected as shown in FIG. 9B, tab 922 displays configuration items (assets) that are of the displayed hardware model. In FIG. 9B, this list consists of just one configuration item (configuration item 924), but in general may include any number of configuration items. Each listed item is summarized to display information related thereto, including its asset tag and cost.

Figure 9C:
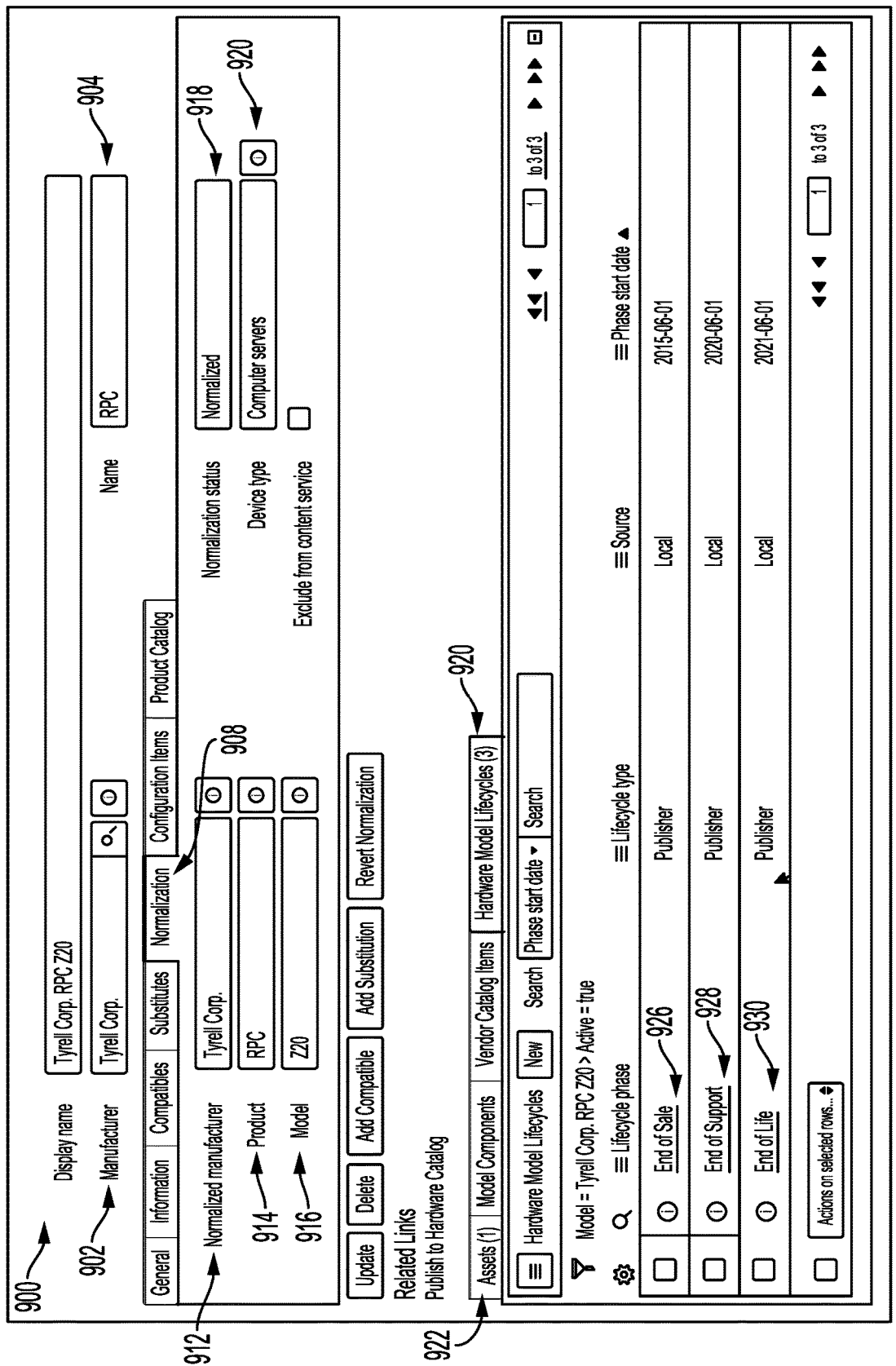

FIG. 9C depicts GUI 900 with tab 920 selected. Accordingly, GUI 900 displays information regarding hardware model lifecycles. This includes end of sale 926, end of support 928, and end of life 930. These attributes have been populated with canonical values for the normalized hardware model in curated hardware list 612. Each of end of sale 926, end of support 928, and end of life 930 is also associated with a date on which the associated lifecycle phase begins.

Figure 9D:
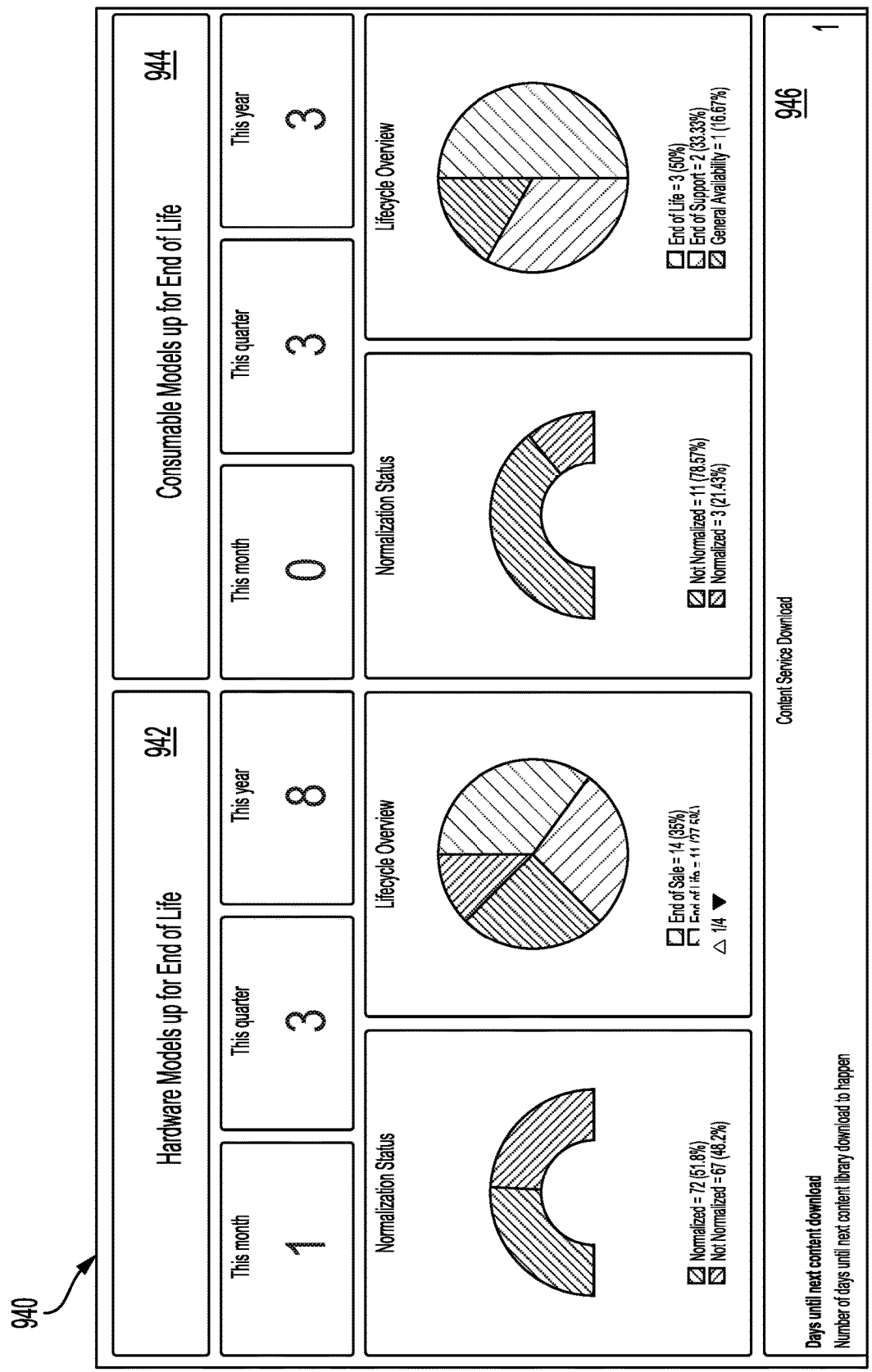
Figure 9E:
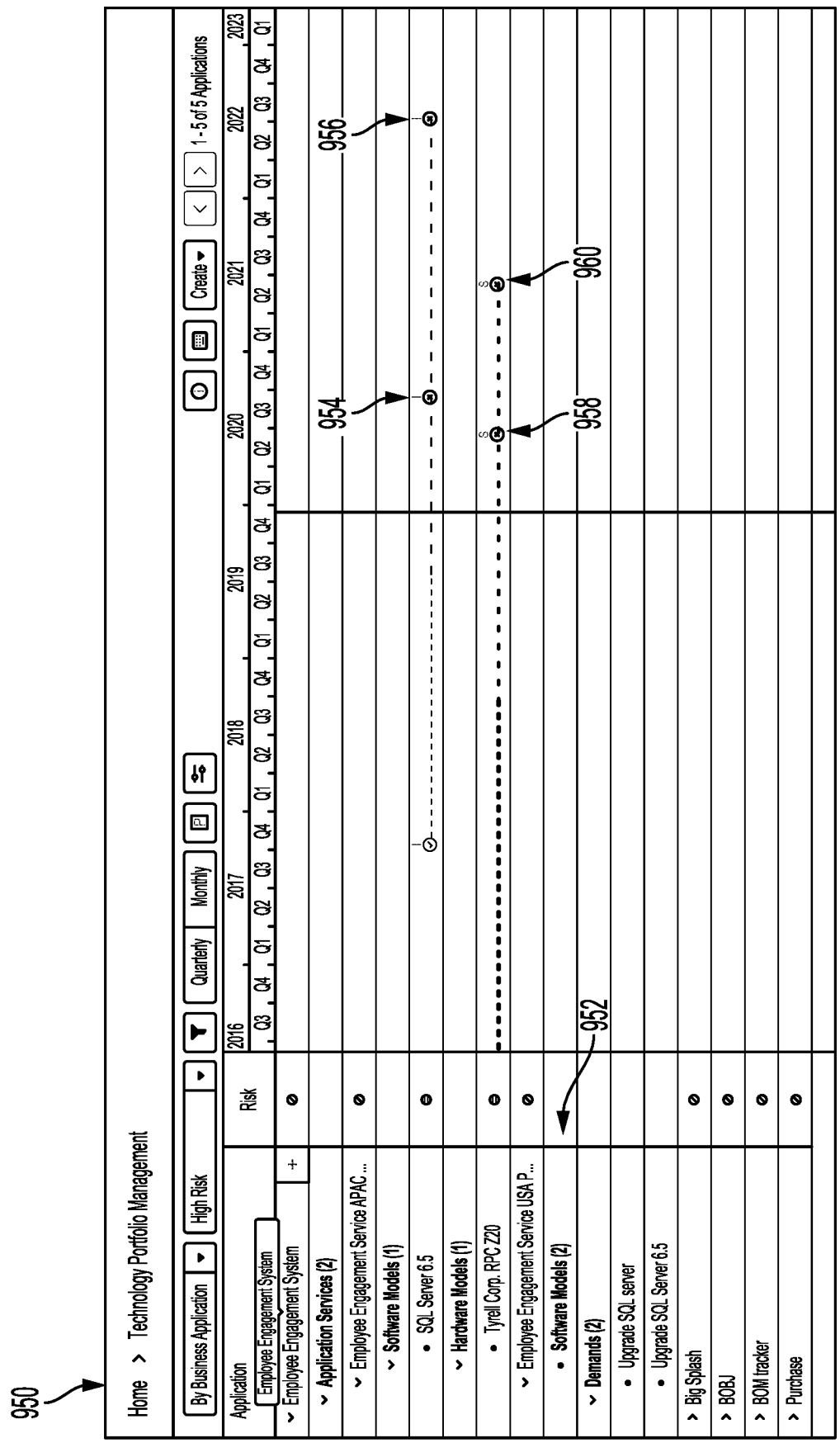

FIGS. 9D and 9E depict GUIs that synthesize lifecycle information for hardware models into intuitive displays that rapidly convey important details of this information. For example, GUI 940 of FIG. 9D includes representations of hardware models in section 942 and representations for consumable hardware models in section 944.

Hardware devices discussed up to this point (e.g., laptops, desktops, servers, routers, load balancers) are considered to be non-consumable. Consumable hardware devices include items such as cables, peripherals, phones, tablets, etc., which are generally used and then disposed of. Hardware devices may be deemed as non-consumable or consumable by a user. For purposes of the discussion herein consumable hardware devices will be treated identically as non-consumable hardware devices.

In any event, section 942 includes panes that indicate the number of hardware models reaching end of life this month, this quarter, and this year. These numbers are displayed prominently in a large font, and are important for purposes of strategic IT planning. For instance, an IT department may determine that it needs to replace hardware models that reach end of life, or purchase support contracts for these hardware models. Notably, the information shown could be for end of sale, end of support, end of extended support, or any other configured lifecycle phase. Section 942 also includes a gauge that visually indicates the number and proportion hardware models that were normalized, as well as a pie chart that visually indicates that number and proportion of hardware models in each lifecycle phase.

Section 944 displays similar information for consumable hardware models. Further, section 946 indicates the number of days before computational instance 322 is scheduled to download a fresh copy of curated hardware list 612 (e.g., from a central instance of remote network management platform 320).

GUI 950 of FIG. 9E depicts aggregated hardware and software lifecycle information for a service. The service may be defined in CMDB 500 to include some number of software packages (each with their own respective lifecycle information from an associated software model) as well as hardware devices (each with their own respective lifecycle information from the associated hardware model). This information is presented in expandable/collapsible hierarchy 952.

For example, the service shown in hierarchy 952 includes one software component and one hardware component. A lifecycle timeline is shown for the software component, indicating (by quarter) when the software component reaches end of life 954 and end of support 956. A similar lifecycle timeline is shown for the hardware component, indicating (also by quarter) when the hardware component reaches end of life 958 and end of support 960.

From this display, an IT department can easily identify the services that are at risk due to software or hardware reaching end of life or end of support. Further, the IT department will know months or quarters ahead of time when these dates are approaching, and can take action to replace the at-risk components or ensure that these components have appropriate support contracts in place.

VII. EXAMPLE OPERATIONS

Figure 10:
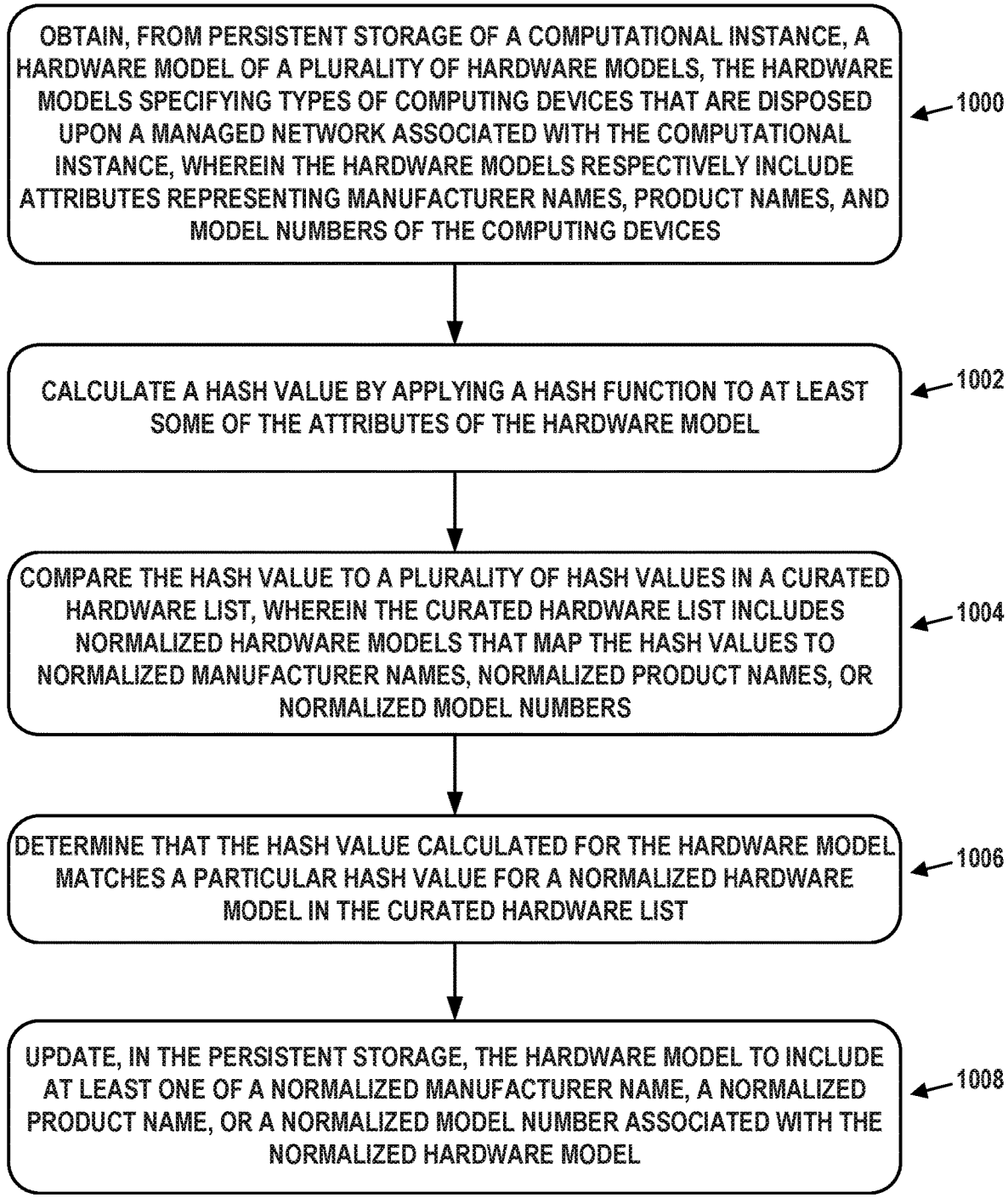
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems, such as computational instance 322.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining, from persistent storage of a computational instance, a hardware model of a plurality of hardware models, the hardware models specifying types of computing devices that are disposed upon a managed network associated with the computational instance, wherein the hardware models respectively include attributes representing manufacturer names, product names, and model numbers of the computing devices. It is possible that not all of these attributes are populated for some of the hardware models.

Block 1002 may involve calculating a hash value by applying a hash function to at least some of the attributes of the hardware model.

Block 1004 may involve comparing the hash value to a plurality of hash values in a curated hardware list, wherein the curated hardware list includes normalized hardware models that map the hash values to normalized manufacturer names, normalized product names, or normalized model numbers. In some cases, combinations of normalized manufacturer names, normalized product names, and normalized model numbers can be matched.

Block 1006 may involve determining that the hash value calculated for the hardware model matches a particular hash value for a normalized hardware model in the curated hardware list.

Block 1008 may involve updating, in the persistent storage, the hardware model to include at least one of a normalized manufacturer name, a normalized product name, or a normalized model number associated with the normalized hardware model.

Some embodiments may involve: determining that the particular hash value is associated with a normalization status, wherein the normalization status is based on the attributes included in or matched using the hash function; and updating, in the persistent storage, the hardware model to include the normalization status.

In some embodiments, the normalization status indicates that the hardware model is normalized when the normalized manufacturer name, the normalized product name, and the normalized model number are matched using the hash function. Alternatively, the normalization status may indicate that the hardware model is manufacturer normalized when only the normalized manufacturer name is matched using the hash function. In other alternatives, the normalization status may indicate that the hardware model is partially normalized when a combination of one or more of the attributes is matched using the hash function, wherein the combination is other than: (i) the normalized manufacturer name, the normalized product name, and the normalized model number, and (ii) only the normalized manufacturer name is matched using the hash function. In particular, matches involving just the product name or a combination of the manufacturer name and the product name may result in a normalization status of partially normalized.

Some embodiments may involve: determining that the normalized hardware model is associated with hardware lifecycle data; and updating, in the persistent storage, the hardware model to include the hardware lifecycle data. In some embodiments, the hardware lifecycle data includes one or more of an end of sales date, and end of life date, an end of support date, or an end of extended support date.

Some embodiments may involve generating and providing for display, on a client device associated with the managed network, a GUI including a first row of tabs. The first row of tabs may contain a first tab that, when actuated, causes display of the normalized manufacturer name, the normalized product name, and the normalized model number. In some embodiments, the GUI also includes a second row of tabs including a second tab and a third tab, wherein the second tab, when actuated, causes display of one or more representation of hardware devices disposed in the managed network and associated with the hardware model, and wherein the third tab, when actuated, displays hardware lifecycle data associated with the normalized hardware model.

Some embodiments may involve hardware lifecycle data that includes dates relating to phases of manufacturer support for each of the plurality of hardware models. These embodiments may also involve generating and providing for display, on a client device associated with the managed network, a GUI including counts of the plurality of hardware models that are reaching one or more of the dates in a next month, a next quarter, or a next year.

Some embodiments may involve hardware lifecycle data that includes dates relating to phases of manufacturer support for each of the plurality of hardware models, wherein software lifecycle data includes dates relating to phases of manufacturer support for each of a plurality of software models, wherein the hardware model and a software model from the plurality of software models are both involved in providing a service deployed in the managed network. These embodiments may also involve generating and providing for display, on a client device associated with the managed network, a GUI including a timeline displaying the dates relating to phases of manufacturer support for the hardware model and the dates relating to phases of manufacturer support for the software model.

In some embodiments, the curated hardware list was downloaded from a central instance of the remote network management platform.

In some embodiments, the plurality of hardware models in the persistent storage were either discovered by probing computing devices disposed upon the managed network or by manual entry.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory storing instructions that, when executed by the one or more hardware processors, cause the one or more hardware processors to perform actions comprising:
receiving a plurality of attributes of a hardware model of a managed network;
comparing a hash value corresponding to one or more attributes of the plurality of attributes to a plurality of hash values in a hardware list, wherein the hardware list includes a plurality of normalized hardware models that map the plurality of hash values to normalized attributes;
determining that the hash value corresponding to the one or more attributes of the plurality of attributes matches a particular hash value of the plurality of hash values in the hardware list; and
updating a database to include at least one normalized attribute associated with the hardware model in response to determining that the hash value matches the particular hash value.

2. The system of claim 1, wherein the actions comprise:
determining a normalization status of the hardware model based on the hash value and the one or more attributes of the plurality of attributes; and
updating the database to include the normalization status of the hardware model.

3. The system of claim 2, wherein the normalization status indicates that the hardware model is normalized or partially normalized.

4. The system of claim 1, wherein the one or more attributes of the hardware model comprise a manufacturer name, a product name, or a model name, or any combination thereof.

5. The system of claim 1, wherein the plurality of hash values comprise a plurality of canonical entries, and wherein each canonical entry of the plurality of canonical entries is logically distinct from other canonical entries of the plurality of canonical entries.

6. The system of claim 5, wherein each canonical entry of the plurality of canonical entries comprises a different combination of attributes.

7. The system of claim 1, wherein receiving the plurality of attributes of the hardware model of the managed network comprises probing one or more computing devices of the managed network, or receiving a manual modification of at least one of the one or more attributes, or both.

8. The system of claim 1, wherein the actions comprise:
determining that the hardware model is associated with hardware lifecycle data; and
updating the database to include the hardware lifecycle data.

9. The system of claim 8, wherein the hardware lifecycle data comprises an end of sales date, and end of life date, an end of support date, or an end of extended support date, or any combination thereof.

10. A method, comprising:
receiving a plurality of attributes of a hardware model of a managed network;
comparing a hash value corresponding to one or more attributes of the plurality of attributes to a plurality of hash values in a hardware list, wherein the hardware list includes a plurality of normalized hardware models that map the plurality of hash values to normalized attributes;
determining that the hash value corresponding to the one or more attributes of the plurality of attributes matches a particular hash value of the plurality of hash values in the hardware list; and
updating a database to include at least one normalized attribute associated with the hardware model in response to determining that the hash value matches the particular hash value.

11. The method of claim 10, comprising:
determining a normalization status of the hardware model based on the hash value and the one or more attributes of the plurality of attributes; and
updating the database to include the normalization status of the hardware model.

12. The method of claim 11, wherein the normalization status indicates that the hardware model is normalized or partially normalized.

13. The method of claim 10, wherein the one or more attributes of the hardware model comprise a manufacturer name, a product name, or a model name, or any combination thereof.

14. The method of claim 10, wherein the plurality of hash values comprise a plurality of canonical entries, and wherein each canonical entry of the plurality of canonical entries is logically distinct from other canonical entries of the plurality of canonical entries.

15. The method of claim 14, wherein each canonical entry of the plurality of canonical entries comprises a different combination of attributes.

16. A non-transitory computer-readable medium comprising computer readable instructions, that when executed by one or more processors, cause the one or more processors to perform operations comprising:
receiving a plurality of attributes of a hardware model of a managed network;
comparing a hash value corresponding to one or more attributes of the plurality of attributes to a plurality of hash values in a hardware list, wherein the hardware list includes a plurality of normalized hardware models that map the plurality of hash values to normalized attributes;
determining that the hash value corresponding to the one or more attributes of the plurality of attributes matches a particular hash value of the plurality of hash values in the hardware list; and
updating a database to include at least one normalized attribute associated with the hardware model in response to determining that the hash value matches the particular hash value.

17. The non-transitory computer-readable medium of claim 16, wherein the operations comprise:
determining a normalization status of the hardware model based on the hash value and the one or more attributes of the plurality of attributes; and
updating the database to include the normalization status of the hardware model.

18. The non-transitory computer-readable medium of claim 16, wherein the one or more attributes of the hardware model comprise a manufacturer name, a product name, or a model name, or any combination thereof.

19. The non-transitory computer-readable medium of claim 16, wherein the plurality of hash values comprise a plurality of canonical entries, and wherein each canonical entry of the plurality of canonical entries is logically distinct from other canonical entries of the plurality of canonical entries.

20. The non-transitory computer-readable medium of claim 19, wherein each canonical entry of the plurality of canonical entries comprises a different combination of attributes.

* * * * *